US007739031B2

(12) United States Patent
Tengler et al.

(10) Patent No.: US 7,739,031 B2
(45) Date of Patent: Jun. 15, 2010

(54) VEHICLE ON-BOARD UNIT

(75) Inventors: Steve Tengler, Grosse Pointe Park, MI (US); Kenneth Ramirez, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 953 days.

(21) Appl. No.: 11/514,976

(22) Filed: Sep. 5, 2006

(65) Prior Publication Data
US 2008/0059057 A1  Mar. 6, 2008

(51) Int. Cl.
*G01C 21/00* (2006.01)
(52) U.S. Cl. ..................... 701/204; 73/178 R
(58) Field of Classification Search .............. 701/204, 701/200, 207–209, 211, 213, 117; 73/178 R; 340/988, 990, 994
See application file for complete search history.

(56) References Cited

U.S. PATENT DOCUMENTS

| 6,317,686 | B1 * | 11/2001 | Ran .............................. 701/210 |
| 7,206,837 | B2 * | 4/2007 | Seligmann .................. 709/224 |
| 7,577,501 | B2 * | 8/2009 | Tafs et al. ..................... 701/14 |

* cited by examiner

Primary Examiner—Dalena Tran
(74) Attorney, Agent, or Firm—Global IP Counselors, LLP

(57) ABSTRACT

A vehicle on-board unit is configured and arranged to report an estimated time of arrival and an accuracy indicator for an estimated time of arrival from historical estimated time of arrival information. The vehicle on-board unit basically has a destination input section, a historical data input section and an estimated time of arrival reporting section. The destination input section is used to enter a destination point. The historical data input section provides historical estimated time of arrival information based on a plurality of actual motorist travel times to the destination point. The estimated time of arrival reporting section reports to a user an estimated time of arrival and an accuracy indicator for the estimated time of arrival from the historical estimated time of arrival information.

19 Claims, 7 Drawing Sheets

VEHICLE ON-BOARD UNIT

BACKGROUND OF THE INVENTION

1. Field of the Invention

The present invention generally relates to a vehicle on-board unit. More specifically, the present invention relates to a vehicle on-board unit that is configured and arranged to report an estimated time of arrival and an accuracy indicator for the estimated time of arrival from historical estimated time of arrival information.

2. Background Information

Recently, vehicles are being equipped with a variety of informational systems such as navigation systems, Sirius and XM satellite radio systems, two-way satellite services, built-in cell phones, DVD players and the like. These systems are sometimes interconnected for increased functionality. Various informational systems have been proposed that use wireless communications between vehicles and between infrastructures, such as roadside units. These wireless communications have a wide range of applications ranging from crash avoidance to entertainment systems. The type of wireless communications to be used depends on the particular application. Some examples of wireless technologies that are currently available include digital cellular systems, Bluetooth systems, wireless LAN systems and dedicated short range communications (DSRC) systems.

Dedicated short range communications (DSRC) is an emerging technology that has been recently investigated for suitability in vehicles for a wide range of applications. DSRC technology will allow vehicles to communicate directly with other vehicles and with roadside units to exchange a wide range of information. In the United States, DSRC technology will use a high frequency radio transmission (5.9 GHz) that offers the potential to effectively support wireless data communications between vehicles, and between vehicles, roadside units and other infrastructure. The important feature of DSRC technology is that the latency time between communications is very low compared to most other technologies that are currently available. Another important feature of DSRC technology is the capability of conducting both point-to-point wireless communications and broadcast wireless messages in a limited broadcast area.

One example of an application of wireless communications in a vehicle informational system is an off-board dynamic navigation system. In the off-board dynamic navigation system, a desired destination is entered by a user through HMI (human-machine interface) of a vehicle on-board unit. Then this desired destination is transmitted to an external navigation server through wireless communications. The navigation guidance service is derived from an external navigation server, which functions as a driving route assistance service information center. The wireless system of the vehicle on-board unit receives route information from the navigation service of the external service server. The route information is communicated to the driver through the HMI of the vehicle on-board unit such as a display or audio. In particular, in such off-board dynamic navigation system, the external service server receives the destination (e.g., address, point of interest) from the vehicle on-board unit via some mode of wireless communication (e.g., cellular, WiMax, WiFi, DSRC) and provides an initial heading. As the vehicle passes a roadside unit, the vehicle on-board unit receives updated route instructions based upon the latest external data (e.g., traffic, construction) transmitted from the external service server. Thus, the off-board dynamic navigation system makes it possible to always have the latest map information and the most suitable route guidance information. Moreover, the large-capacity storage device required for conventional on-board navigation is not needed when the external service server is used for providing the navigation service.

These external navigation servers sometimes provides an estimated time of arrival (ETA) for the selected route. Typically, the estimated time of arrival (ETA) is calculated using an algorithm that takes into account various road characteristics such as distance, road speed limits, traffic lights etc. While an estimated time of arrival calculated by this method can be quite helpful, the estimated time of arrival is often inaccurate because it does not consider other factors such as time of day (rush hour or non-rush hour), traffic congestion, road construction, etc.

In view of the above, it will be apparent to those skilled in the art from this disclosure that there exists a need for an improved vehicle on-board unit. This invention addresses this need in the art as well as other needs, which will become apparent to those skilled in the art from this disclosure.

SUMMARY OF THE INVENTION

One object of the present invention is to provide a vehicle on-board unit that reports an accuracy indicator for an estimated time of arrival.

In view of the above, a vehicle on-board unit in accordance with one aspect of the present invention was developed in order to achieve the above mentioned object and other objects of the present invention. The vehicle on-board unit of this aspect of the present invention basically comprises a destination input section, a historical data input section and an estimated time of arrival reporting section. The destination input section is configured to enter a destination point. The historical data input section is configured to provide historical estimated time of arrival information based on a plurality of actual motorist travel times to the destination point. The estimated time of arrival reporting section is configured to report to a user an estimated time of arrival and an accuracy indicator for the estimated time of arrival from the historical estimated time of arrival information.

In accordance with another aspect of the present invention, an estimated time of arrival reporting system is provided that basically comprises a plurality of vehicles that communicate with equipped with a base station. Each of the vehicles includes a vehicle travel data collecting section, a destination input section and a two-way communication unit. The vehicle travel data collecting section is configured to collect travel route data that includes travel times between at least two locations actually traveled. The destination input section is configured to enter a destination point. The two-way communication unit is configured to transmit the travel route data and receive historical estimated time of arrival information including an estimated time of arrival and an accuracy indicator for the estimated time of arrival. The base station includes two-way communications configured to receive the travel route data from the vehicles, and to selectively send the historical estimated time of arrival information based on the travel route data that was received to the vehicles in response to a vehicle's request.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
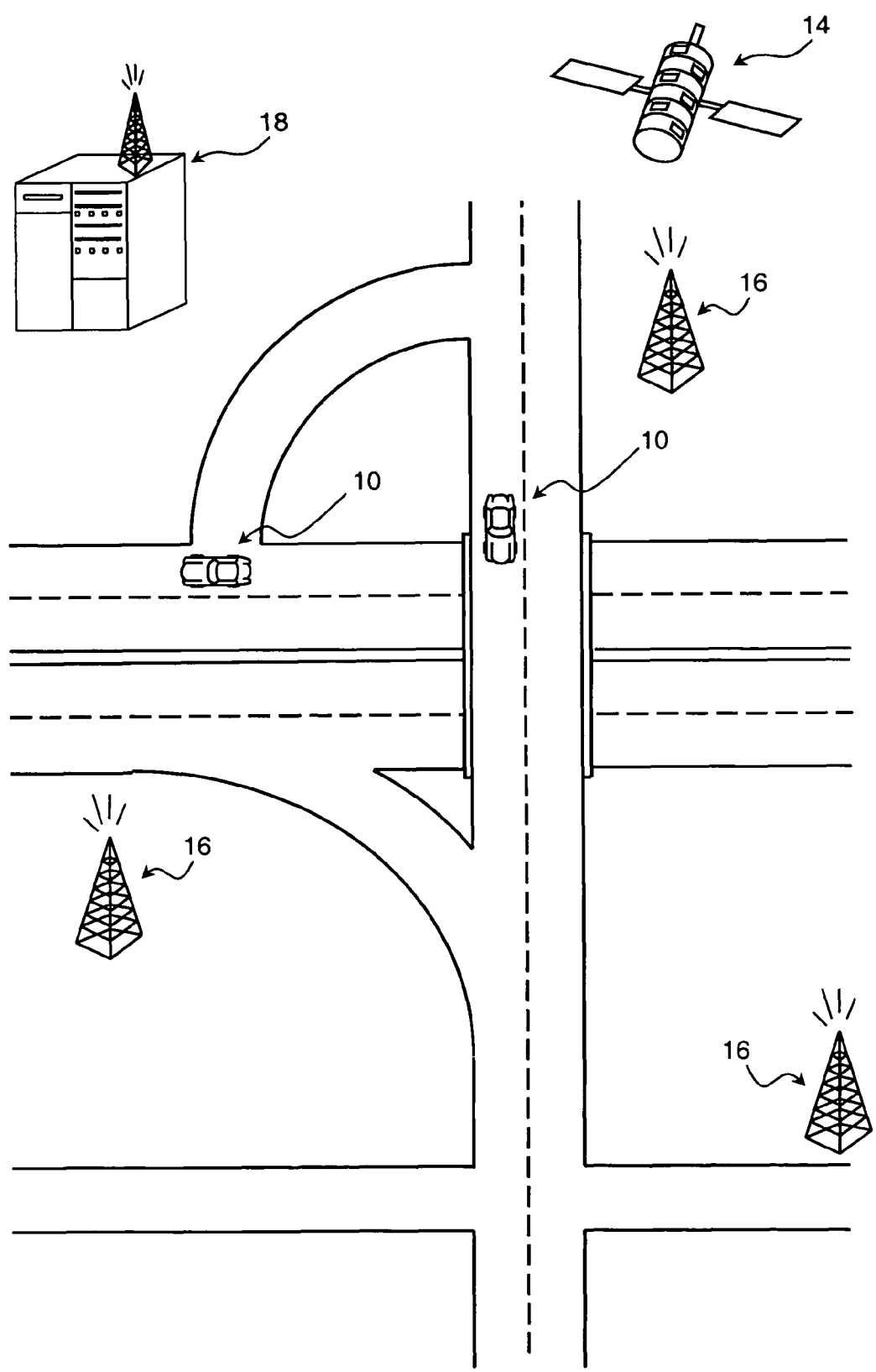
FIG. 1 is a pictorial representation of a two-way wireless communications network showing several vehicles equipped with an on-board unit capable of conducting two-way wireless communications with each other and as well as an external server via a plurality of roadside units in a vehicle infrastructure system in accordance with the present invention.
Figure 2:
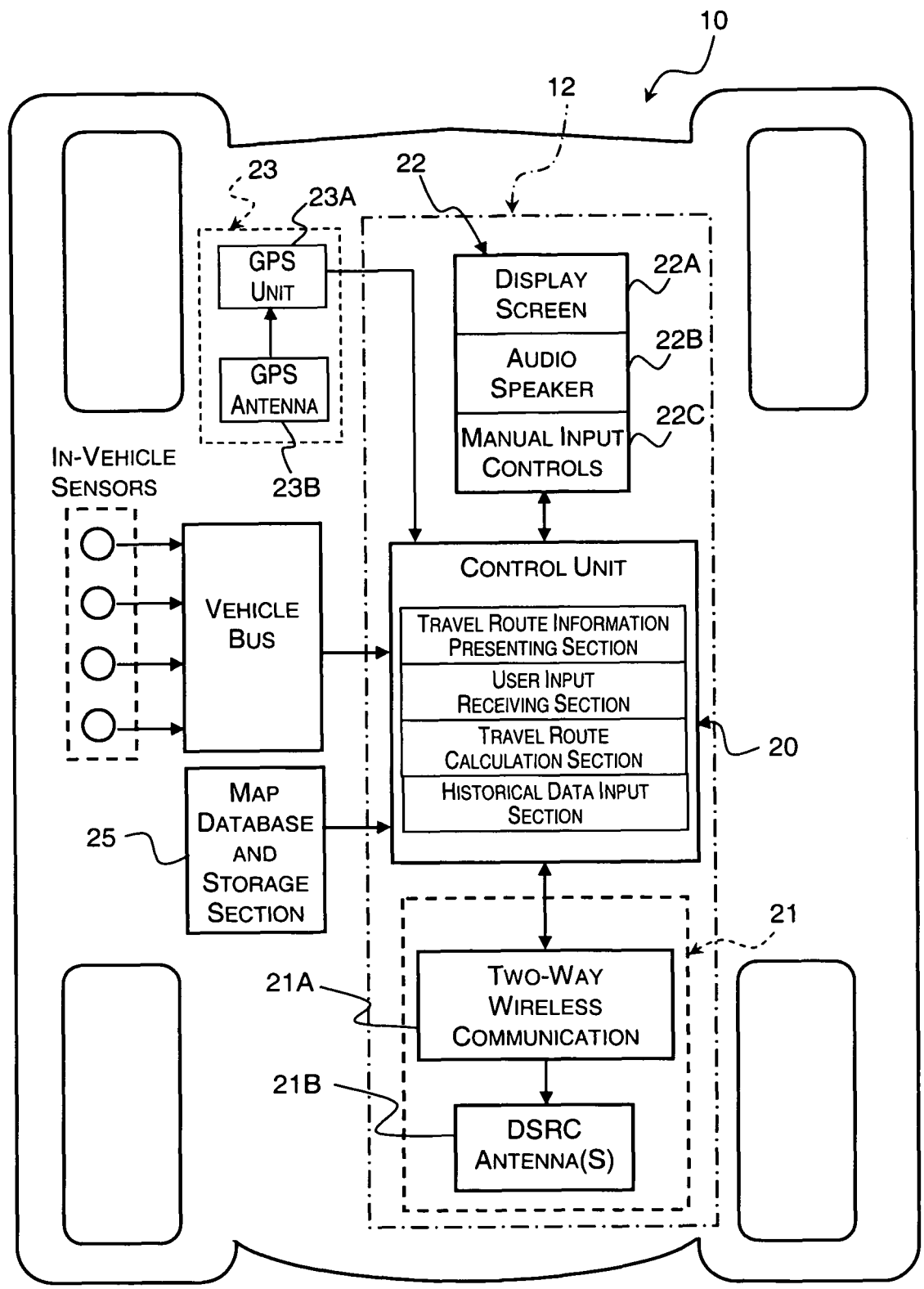
FIG. 2 is a schematic representation of a vehicle that is equipped with the on-board unit for conducting two-way wireless communications in the vehicle infrastructure system in accordance with the present invention.
Figure 3:
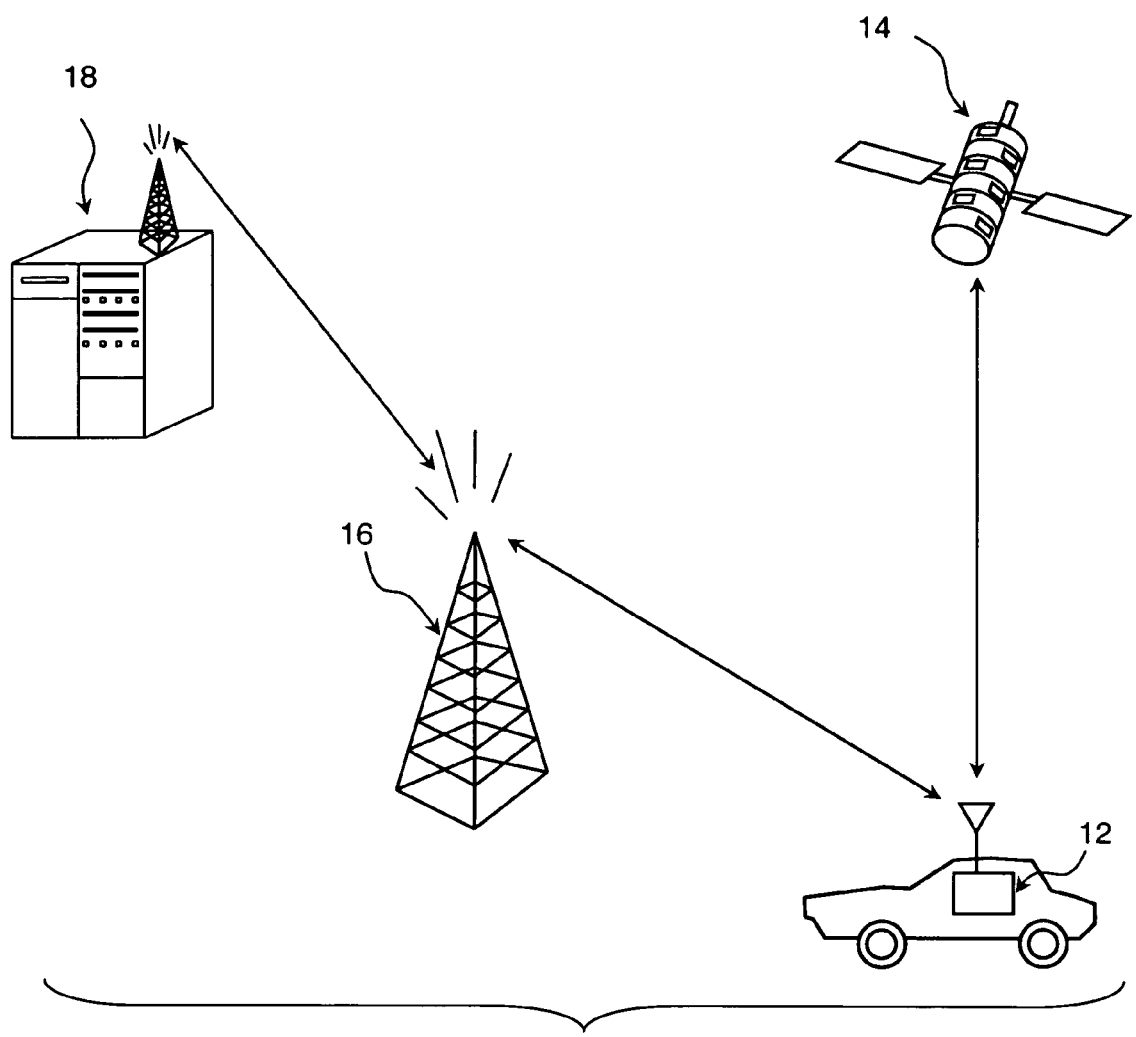
FIG. 3 is a pictorial representation of the two-way wireless communications network showing the various communications in the vehicle infrastructure system in accordance with the present invention.
Figure 4:
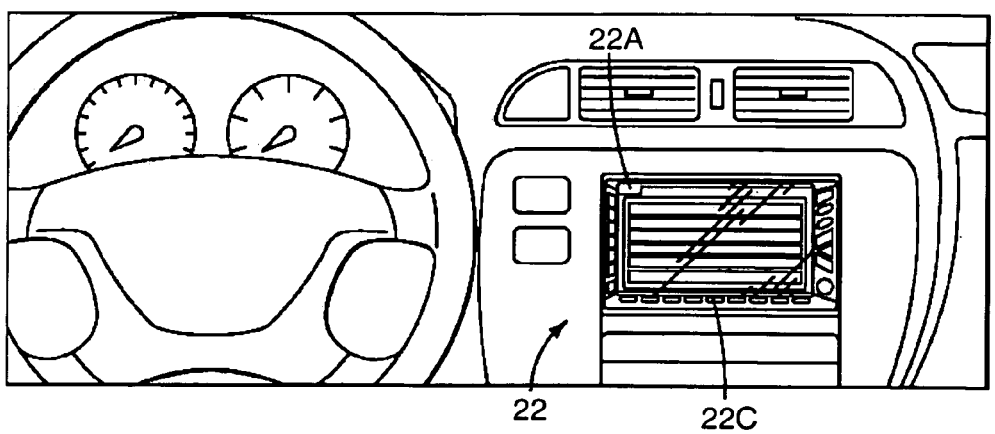
FIG. 4 is an inside elevational view of a portion of the vehicle's interior that is equipped with the on-board unit for conducting two-way wireless communications in the vehicle navigation system in accordance with the present invention.

Referring initially to FIGS. 1 to 3, a two-way wireless communications network is illustrated that forms a part of a vehicle infrastructure system in accordance with one embodiment of the present invention. In this vehicle infrastructure system, a plurality of host vehicles 10 are each equipped with a vehicle on-board unit 12 in accordance with one embodiment of the present invention. The two-way wireless communications network also preferably includes one or more global positioning satellites 14 (only one shown), one or more roadside units 16 and a base station or external server 18 (estimated time of arrival and an accuracy indicator providing system). As explained below, the vehicle on-board unit 12 is configured and arranged to report an estimated time of arrival and an accuracy indicator for the estimated time of arrival from historical estimated time of arrival information.

Referring now to FIG. 2, the vehicle on-board unit 12 of the present invention basically includes a controller or control unit 20, a two-way wireless communication system 21 and a human-machine interface section 22. The two-way wireless communication system 21 is configured and arranged such that the control unit 20 receives and/or sends various signals to other DSRC equipped component and systems in the communication (broadcasting/receiving) area that surrounds the host vehicle 10. The human-machine interface section 22 includes a screen display 22A, an audio speaker 22B and a plurality of manual input controls 22C that are operatively coupled to the control unit 20. The control unit 20 is also preferably coupled to a global positioning system 23 (constituting a navigation unit) having a GPS unit 23A and a GPS antenna 23B. A map database and storage section 25 is also preferably provided that contains various data used by the control unit 20 to carry out the navigation controls as well as implementation of various safety measures. The map database and storage section 25 can be manual updated through removable media (CD-ROM or DVD) or automatically updated via periodic communications with the external server 18. The control unit 20, the human-machine interface section 22, the global positioning system 23 and the map database and storage section 25 are operatively connected together to perform the various navigation functions, and thus, together these components constitute an on-board navigation unit. Moreover, the control unit 20 of the vehicle on-board unit 12 is configured to receive detection signals from various in-vehicle sensors including, but not limited to, an ignition switch sensor, an accessory switch sensor, a vehicle speed sensor, an acceleration sensor, etc.

Figure 7:
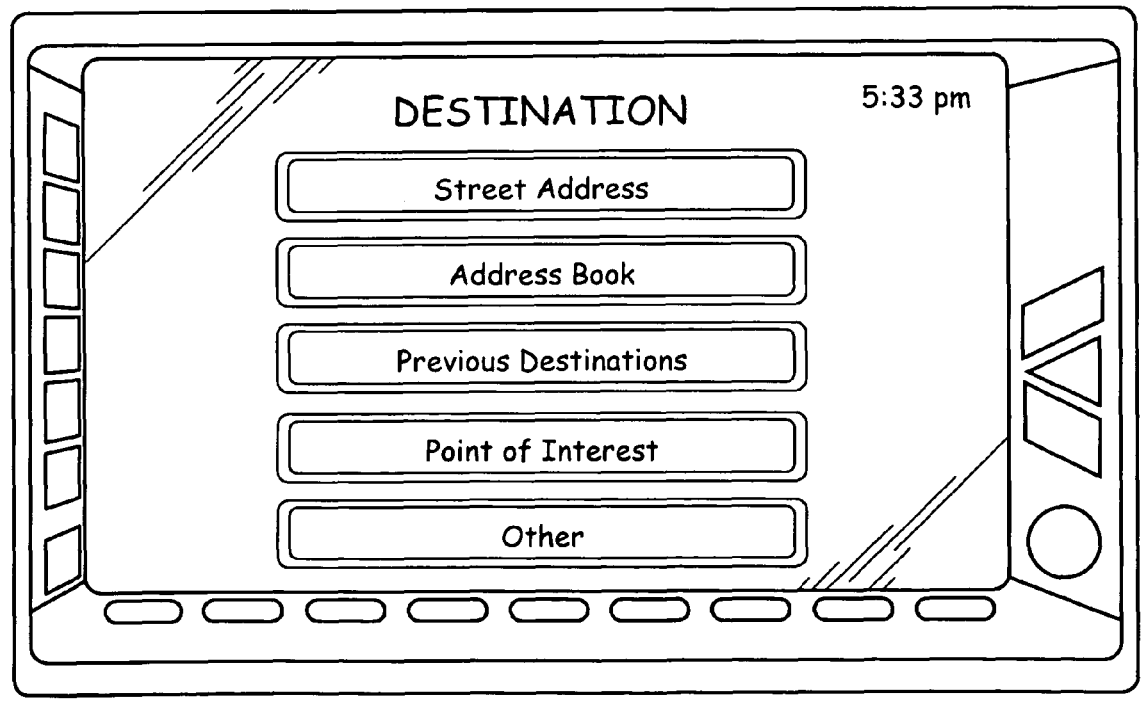
FIG. 7 is a pictorial representation of the "Destination" screen display of the human-machine interface section of the on-board unit in accordance with the present invention.
Figure 8:
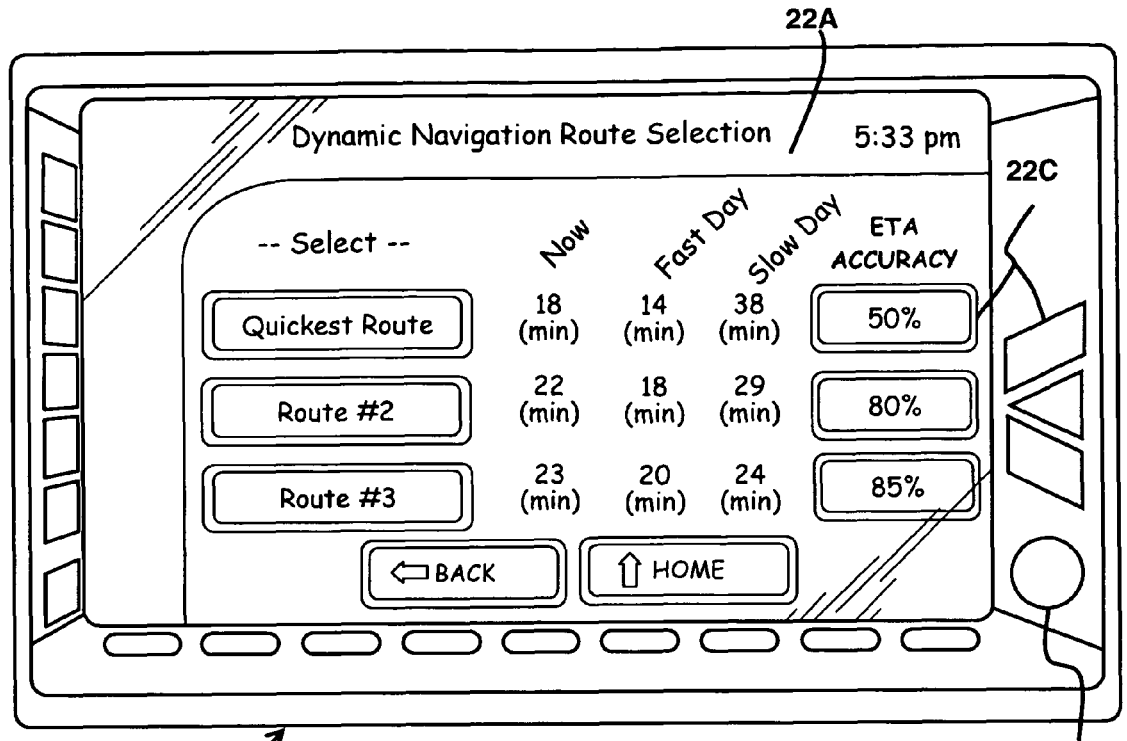
FIG. 8 is a pictorial representation of the "Dynamic Navigation Route Selection" screen display of the human-machine interface section of the on-board unit in accordance with the present invention.

In the present invention, the control unit 20 and the human-machine interface section 22 cooperate together to constitute both a user inputting section and a reporting section. In other words, the driver or other user uses the human-machine interface section 22 to instruct the control unit 20 to obtain and provide potential travel routes as well as estimated times of arrival and accuracy indicators for the estimated times of arrival based on historical estimated time of arrival information that were previously compiled for the potential travel routes. Generally speaking, the driver first turns on the navigation unit using the input controls 22C of the human-machine interface section 22. Then, after the user moves through various screen displays, the user will come to the "Destination" screen display on the screen display 22A as seen in FIG. 7. Thus, the control unit 20 and the screen display 22A and the input controls 22C of the human-machine interface section 22 cooperate together to constitute a destination input section that is configured to enter allow the user to input a destination point. Once a destination point has been entered using one of the available methods, the user depresses the routes button to obtain potential travels routes. In other words, the "Dynamic Navigation Route Selection" screen display is displayed on the screen display 22A, as seen in FIG. 8, to provide the user with one or more potential travels routes. The potential travels routes can be provided by either the external server 18 or the on board navigation unit.

As seen in FIG. 8, for each of the potential travels routes, the "Dynamic Navigation Route Selection" screen display includes estimated times of arrival and ETA accuracy indicators for each of the estimated times of arrival. The estimated times of arrival are based on historical estimated time of arrival information that were previously compiled for the potential travel routes. Thus, when the estimated times of arrival and the accuracy indicators are communicated by the external server 18 as in the most preferred embodiment, the two-way wireless communication system 21 constitutes a historical data input section that is configured to provide historical estimated time of arrival information based on a plurality of actual motorist travel times to the destination point. In other words, in the preferred embodiment, the two-way communication system 21 is configured to transmit the travel route data (designation point, record travel times and/or potential travel routes) to the external server 18 and receive historical estimated time of arrival information including an estimated time of arrival and an accuracy indicator for the estimated times of arrival for each potential travel routes from the external server 18. Alternatively, the historical data (e.g., the estimated times of arrival and the accuracy indicators) could be prestored in the map database and storage section 25. When the historical data (e.g., the estimated times of arrival and the accuracy indicators) is prestored in the map database and storage section 25, the map database and storage section 25 constitutes the historical data input section that is configured to provide the historical estimated time of arrival information. In either case, the control unit 20 and the screen display 22A cooperate together to constitute an estimated time of arrival reporting section that is configured to report to a user the estimated times of arrival and the accuracy indicator for the estimated times of arrival for each of the potential travel routes from the historical estimated time of arrival information. Preferably, the control unit 20 is configured to display the estimated time of arrival and the accuracy indicator together on a single screen display on the screen display 22A as seen in FIG. 8. Also, the control unit 20 is preferably configured to display a map (FIG. 10) including the destination point with the map being divided into areas having the accuracy indicator provided for each of the areas as explained below.

The control unit 20 and the two-way wireless communication system 21 cooperate together to constitute a vehicle travel data collecting section that is configured to collect travel route data that includes travel times between at least two locations actually traveled and then send the collected route data to the external server 18. The external server 18 will then record the travel route data from the vehicles 10 and compile a statistical database of the historical data including, but not limited to, estimated times of arrival data with historically based ETA accuracy indicators for the estimated times of arrival. Because the historical estimated time of arrival information is based on actual travel times of motorists that have traveled the routes, the driver can be given more accurate travel times for a travel route.

As seen in FIG. 3, the external server 18 is configured and arranged to communicate with the vehicle on-board units 12 to provide various services the vehicles 10 through wireless communications via the roadside units 16 within the two-way wireless communications network. In particular, the roadside units 16 (two shown) relays signals between the vehicle on-board units 12 of the host vehicles 10 and the external server 18. Thus, the roadside units 16 are configured to send signals to the external server 18 and the vehicle on-board units 12 of the host vehicles 10, and receive signals from the vehicle on-board units 12 of the host vehicles 10 and the external server 18. While the two-way wireless communications network is illustrated as a dedicated short range communications (DSRC) network, it will be apparent to those skilled in the art from this disclosure that other types of two-way wireless communications networks can be used to carry out the present invention. For example, it will be apparent to those skilled in the art from this disclosure that two-way communications such as cellular, Wimax, Wifi, etc can be used as a two-way wireless communications network to carry out the present invention.

In the present invention, the external server 18 collects various information or data from the vehicles 10 through two-way wireless communications to compile historical estimated time of arrival information or data based on actual travel times of motorists that have traveled the routes and compile accuracy indicators for the estimated times of arrival from the historical estimated time of arrival information. Upon receiving an ETA request from one of the vehicles 10, the external server 18 then at least provides estimated times of arrival and historically based ETA accuracy indicators for the estimated times of arrival for each of the potential travel routes. Preferably, the external server 18 acts as an off-board navigation service, and provides the potential travel routes to the vehicles 10 with the estimated times of arrival and the accuracy indicators for each potential travel route, upon receiving a travel route request from one of the vehicles 10. In other words, in one preferred embodiment of the present invention, the external server 18 acts as a base station with two-way communications that receives the travel route data from the vehicles, and selectively sends a plurality of potential travel routes to the destination point as well as the historical estimated time of arrival information with historically based ETA accuracy indicators for the travel route data that was requested. Of course, it is also possible for the potential travel routes to be determined by the on-board navigation unit, and then the external server 18 would only provide the estimated times of arrival and the accuracy indicators for the estimated times of arrival for these potential travel routes that were determined by the on-board navigation unit. Thus, either the external server 18 or the map and database and storage section 25 cooperate with the control unit 20 to constitute a travel route information section that is configured to provide at least one potential travel route to the destination point.

The global positioning satellite 14 is a conventional component that is known in the art. Since the global positioning satellite is known in the art, the structures of the global positioning satellite 14 will not be discussed or illustrated in detail herein. Rather, it will be apparent to those skilled in the art from this disclosure that the global positioning satellite 14 can be any type of structure that can be used to carry out the present invention.

The host vehicles 10 are preferably each equipped with a vehicle travel data collection unit so that information can be communicated between the host vehicle 10 and the nearby roadside units 16 within the two-way wireless communications network. More specifically, each of the roadside units 16 is equipped with a DSRC unit or other suitable two-way wireless communication system for broadcasting and receiving signals to/from the host vehicles 10 located within a prescribed communication (broadcasting/receiving) region surrounding the roadside unit 16. Moreover, each roadside unit 16 is preferably an IP enabled infrastructure that is configured and arranged to establish a link between the vehicle on-board unit 12 of the host vehicle 10 and an external service provider, such as the external server 18. Since roadside units are known in the art, the structures of the roadside units 16 will not be discussed or illustrated in detail herein. Rather, it will be apparent to those skilled in the art from this disclosure that the roadside unit can be any type of structure that can be used to carry out the present invention.

Specifically, in the present invention, the roadside unit 16 is configured and arranged to establish a link between the vehicle on-board unit 12 of the host vehicle 10 and the external server 18. An example is shown in FIG. 2 in which the vehicle on-board unit 12 of the host vehicle 10 establishes a link to the external server 18 via the roadside unit 16 in close proximity to the host vehicle 10. The external server 18 is, for example, a telecommunications provider or a service provider such as the vehicle's manufacturer. The external server 18 functions as a navigation server that provides the off-board dynamic navigation service to the host vehicle 10 through wireless communications. The vehicle on-board unit 12 is configured and arranged to download historical time information based on a plurality of actual motorist travel times through the roadside unit 16 during a single communication. More specifically, upon entering a destination point into the vehicle on-board unit 12, the vehicle on-board unit 12 is configured and arranged to download historical information via the roadside unit 16 based on the actual motorist travel times to navigate various travel routes. The vehicle on-board unit 12 is further configured to update the historical information as the host vehicle 10 travels along a selected route. Thus, as the host vehicle 10 enters a communication area of the roadside unit 16, the updated historical information is downloaded via the roadside unit 16 in proximity to the host vehicle 10.

The control unit 20 preferably includes a microcomputer with a travel route information display program. The control unit 20 also preferably includes other conventional components such as an input interface circuit, an output interface circuit, and storage devices such as a ROM (Read Only Memory) device and a RAM (Random Access Memory) device. The memory circuit stores processing results and control programs such as ones for operation of the two-way wireless communication system 21, the human-machine interface section 22, the global positioning system 23 that are run by the processor(s). The control unit 20 is capable of selectively controlling other DSRC components of the host vehicle 10 such as other safety systems as needed and/or desired. It will be apparent to those skilled in the art from this disclosure that the precise structure and algorithms for the control unit 20 can be any combination of hardware and software that will carry out the functions of the present invention.

The two-way wireless communication system 21 preferably includes communication interface circuitry that connects and exchanges information with other ones of the vehicles 10 that are similarly equipped as well as with the roadside units 16 through a wireless network within the broadcast range of the host vehicle 10. The two-way wireless communication system 21 is preferably configured and arranged to conduct direct two-way communications between vehicles (vehicle-to-vehicle communications) and roadside units (roadside-to-vehicle communications). Moreover, the two-way wireless communication system 21 is preferably configured to periodically broadcast a signal with a so called common message set in the broadcast area. The so called common message set can be broadcasted in three different way, i.e., (1) event based broadcasting, (2) periodic broadcasting and (3) hybrid (event based/periodic) broadcasting. Preferably, periodic broadcasting or hybrid (event based/periodic) broadcasting is used to carry out the present invention.

More specifically, as seen in FIG. 2, the two-way wireless communication system 21 is an on-board unit that includes a host vehicle two way communication device 21A and one or more antennas 21B. As mentioned above, the two-way wireless communication system 21 can be any suitable two-way wireless system, e.g., DSRC cellular, Wimax, Wifi, etc. The two way communication device 21A is configured to at least conduct direct short range communications in a host vehicle broadcast area surrounding the host vehicle 10 via the antennas 21B. Preferably, the antennas 21B include both an omnidirectional antenna and a multi-directional antenna. In one preferred embodiment, the two-way wireless communication system 21 is a dedicated short range communication (DSRC) system, since the latency time between communications is very low compared to most other technologies that are currently available. However, other two-way wireless communication systems can be used if they are capable of conducting both point-to-point wireless communications and broadcast wireless messages in a limited broadcast area so long as the latency time between communications is short enough to carry out the present invention. When the two-way wireless communication system 21 is a DSRC system, the two-way wireless communication system 21 will transmit at a 75 Mhz spectrum in a 5.9 GHz band with a data rate of 1 to 27 Mbps, and a maximum range of about 1,000 meters. Preferably, the two-way wireless communication system 21 includes seven (7) non-overlapping channels. The two-way wireless communication system 21 will be assigned a Medium Access Control (MAC) address and/or an IP address so that each vehicle in the network can be individually identified.

Referring to FIGS. 4 and 6 to 10, the human-machine interface section 22 is installed in the host vehicle 10. Specifically, the display unit 22A is configured to display the potential travel routes, a range of the expected travel times for each of the potential travel routes, and historically based ETA accuracy indicators for the potential travel routes. The manual input controls 22C are used to input the destination point. It will be apparent to one of skill in the art from this disclosure that the manual input controls 22C do not necessarily require a keypad, touchpad, or the like. Rather, the manual input controls 22C can include a microphone and the control unit 20 can include voice recognition software so that the user can speak the destination point as well as other commands for operating the navigation unit. Furthermore, the audio speaker 22B can be used to not only confirm receipt of input but also can be used to provide the travel route information and/or the expected travel times.

The global positioning system 23 is a conventional global positioning system (GPS) that is configured and arranged to receive global positioning information of the host vehicle 10 in a conventional manner. Basically, the GPS unit 23A is a receiver for receiving a signal from the global positioning satellite 14 (FIG. 1) via the GPS antenna 23B. The signal transmitted from the global positioning satellite 14 is received at regular intervals (e.g. one second) to detect the present position of the host vehicle 10. The GPS unit 23A preferably has an accuracy of indicting the actual vehicle position within a few meters or less. This data (present position of the host vehicle) is fed to the control unit 20 for processing. Moreover, the GPS data is also transmitted to the external server 18 through wireless communications for the off-board navigation processing.

As mentioned above, in this embodiment of the present invention, the external server 18 preferably functions as a navigation server that provides an off-board dynamic navigation service to the host vehicles 10 through wireless communications. The external server 18 stores road map data as well as the historical time information or data that can be associated with the road map data. The user of the vehicle on-board unit 12 receives the off-board dynamic navigation service from the external server 18 through the human-machine interface section 22. More specifically, upon the user inputting the desired destination (e.g., address, point of interest, etc.) by operating the input controls 22C of the human-machine interface section 22, the desired destination is sent to the external server 18 through wireless communications as well as a current position of the host vehicle 10 based on the GPS information. The external server 18 calculates one or more potential travel routes from the current position to the destination position, and sends the potential travel route(s) to the vehicle on-board unit 12 of the host vehicle 10. The on-board navigation unit then begins normal navigational assistance using the selected travel route from the one or more potential travel routes sent by the external server 18. Of course, as mentioned above, the potential travel routes could also be determined by the on-board navigation unit instead of the external server 18, if needed and/or desired. As the host vehicle 10 travels and passes one of the neighboring roadside units 16, the vehicle on-board unit 12 preferably receives updated route instructions from the external server 18 based upon the latest external data (e.g., traffic, construction) through the two-way wireless communication system 21. The signals transmitted from the global positioning satellites 14 are utilized to guide the host vehicle 10 through the off-board navigation control executed in the external server 18 in a conventional manner.

As seen in FIG. 2, the control unit 20 is programmed to include functions representing a travel route information presenting section, a user input receiving section, a travel route calculation section and a historical data input section. The travel route information presenting section is configured to present data to the human-machine interface section 22. Specifically, the travel route information presenting section presents the expected travel times for a plurality of available routes to the screen display 22A and/or the audio speaker 22B. Thus, the screen display 22A and/or the audio speaker 22B in conjunction with the control unit 20 constitute an expected travel time reporting section that is configured to report to a user a plurality of expected travel times with historically based ETA accuracy data. The user input receiving section is configured to receive data from the human-machine interface section 22. Specifically, the user input receiving section receives information entered into the vehicle on-board unit 12 from the manual input controls 22C. Thus, the manual input controls 22C constitute a destination input section that is configured to enter a destination point. The travel route calculation section is configured to obtain travel route information from the global positioning system 23 and the map database and storage section 25. The historical data input section communicates with the host vehicle two way communication device 21A of the two-way wireless communication system 21 to obtain historical time information based on a plurality of actual motorist travel times to navigate various travel routes.

The roadside units 16 are configured to obtain positions of the host vehicles 10 that are traveling along various routes. The two-way wireless communication system 21 of host vehicles 10 communicates with the roadside units 16 along the travel route. The roadside units 16 are positioned at various distances along different routes. Actual motorist travel times between the roadside units 16 are collected and stored at the external server 18. The external server 18 includes two-way communications configured to receive and store the travel route segment travel data from the roadside units 16. Each of the roadside units 16 covers a communication area that covers various roads. The roads are preferably broken into a plurality of road segments. These road segments are used to form the travel routes contained within the communication area. Thus, the actual motorist travel times for the various road segments are collected by the roadside units 16 and then stored at the external server 18. Thus, the external server 18 is configured to provide historical data for each of the road segments as well as a particular route that is formed of several road segments. The actual motorist travel times of the road segments constitute historical time information or data.

Figure 5:
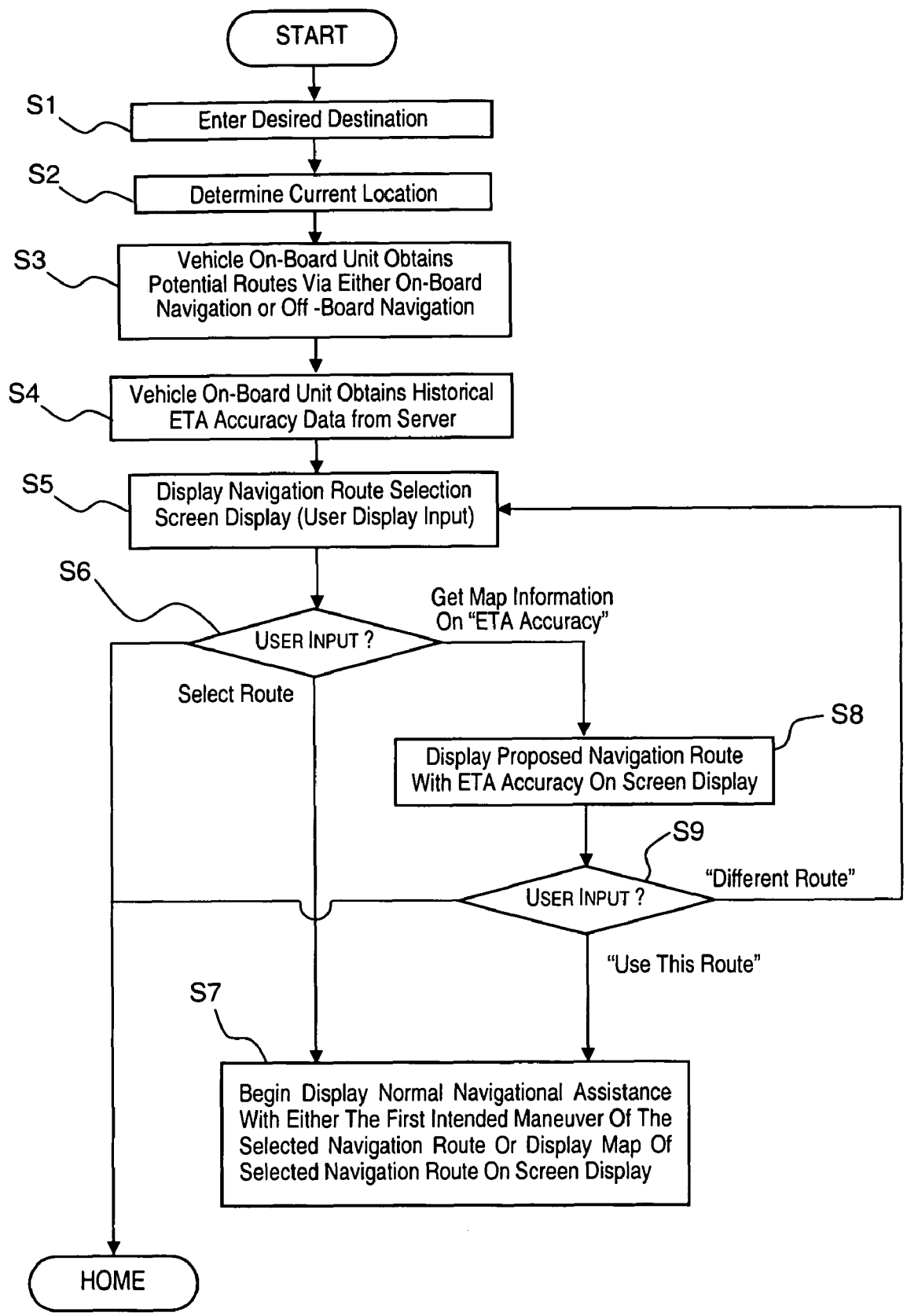
FIG. 5 is a flowchart illustrating a flow of control executed in the on-board unit in accordance with the present invention.
Figure 6:
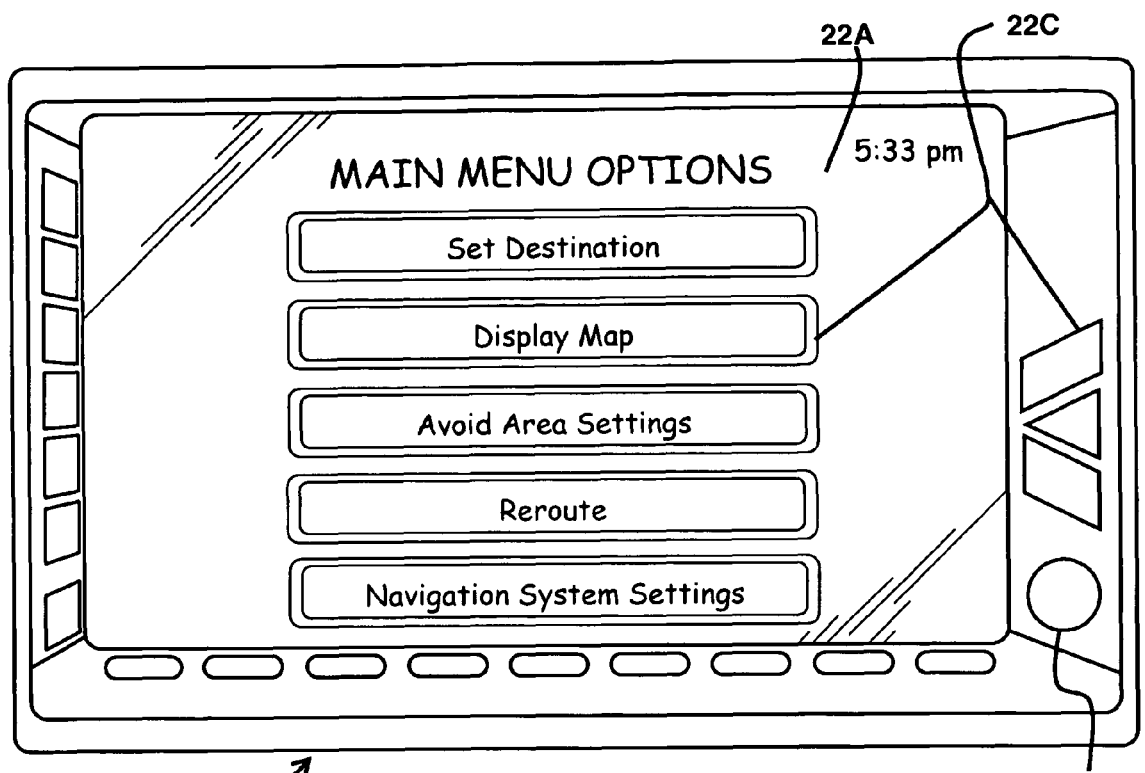
FIG. 6 is a pictorial representation of the "Main Menu Options" screen display of the human-machine interface section of the on-board unit in accordance with the present invention.

Referring now to a flowchart of FIG. 5, a simplified flow chart is illustrated to explain the basic functions that are performed in the vehicle on-board unit 12 in accordance with one embodiment of the present invention. In other words, the basic control executed in the external server 18 and the vehicle on-board unit 12 in the vehicle navigation system in accordance with one embodiment of the present invention will be explained. Of course, it will be apparent to those skilled in the art from this disclosure that other options, can be provided to the user in addition to the ones described and illustrated in the embodiment being used to illustrate the basic functions of the present invention.

After the user of the vehicle on-board unit 12 turns on the human-machine interface section 22, the display unit 22A presents the user with the "Main Menu Option" screen display (e.g., home screen display) as seen in FIG. 7. Here, the user is presented with several options which can be selected using the manual input controls 22C using buttons, a joy stick, a microphone, etc. While each of the commands can performed by speaking the command to a microphone of the manual input controls 22C, for the sake of simplicity, the following explanation will be limited to buttons.

From the "Main Menu Option" screen display, the user touches the "Set Destination" button to move to the "Destination" screen display as seen in FIG. 8, where the user can select a variety of conventional methods of setting the destination. Since these conventional methods of setting the destination are well known, they will not be discussed herein. In any event, once the user enters a desired destination position (step S1) in a conventional manner, the current location of the host vehicle 10 is preferably determined as a route initialization or starting point based on the GPS information from the GPS system 23 (step S2). However, a route initialization or starting point can be manually entered for the travel route in step S2, if desired and/or needed.

Next in step S3, the vehicle on-board unit 12 obtains potential route data from either a navigation unit or from the external server 18. For example, this potential route data can be obtained from the map database and storage section 25 that is updated at a prescribed interval from the external server 18 and then the navigation unit calculates one or potential travel routes from the route initialization point (e.g., the current location of the host vehicle 10 or a manually entered point) to the destination position. Alternatively, the entered destination position and the route initialization point are transmitted (e.g., DSRC, cellular, Wimax, Wifi, etc.) to the external server 18 as a routing request through the available wireless communications between the vehicle on-board unit 12 and the external server 18 (step S3). Upon receiving the routing request from the vehicle on-board unit 12, the external server 18 is configured to calculate one or potential travel routes from the route initialization point (e.g., the current location of the host vehicle 10 or a manually entered point) to the destination position, and to send the potential travel routes to the vehicle on-board unit 12 of the vehicle 10.

Next, preferably simultaneously with step S3, the vehicle on-board unit 12 obtains historical ETA Accuracy data associated with the potential travel routes from a database or storage device of the external server 18 (step S4). Alternatively, the historical ETA Accuracy data associated with the potential travel routes can be obtained from the map database and storage section 25 that is updated at a prescribed interval time.

Then in the process (step S5), a "Dynamic Navigation Route Selection" screen display is present to the user on the display 22A as seen in FIG. 8. In the illustrated example, the "Dynamic Navigation Route Selection" screen display presents three potential travel routes with estimated time of arrival (ETA) accuracy data for each of the potential travel routes. This ETA accuracy data is based on actual travel times that were reported to the external server 18.

As seen in FIG. 8, in the illustrated embodiment, the display unit 22A is configured to display three potential travel route selections with corresponding expected travel times and ETA accuracy data for each potential travel route on the "Dynamic Navigation Route Selection" screen display. For example, a quickest route selection is displayed with a now time, a fast day time and a slow day time. The now time corresponds to a middle expected travel time. The fast day corresponds to a fast expected travel time and the slow day corresponds to a slow expected travel time. Accordingly, a user is able to view available routes with expected travel times based on actual motorist travel times to navigate the available routes. Once the user decides on a route, the user touches a Route # selection button to select and display the selected route on a map or display the first intended maneuver of the travel route. Of course, as mentioned above, the travel route can also be selected from other screen displays as mentioned above.

At this point, the user is preferably presented with at least two choices or options (step S6), i.e., (1) select one of the potential travel routes, or (2) view a map that pictorially displays an area containing one of the potential travel routes. Of course, it will be apparent to those skilled in the art from this disclosure that other choices or options could be provided to the user, if desired and/or needed. Also, it will be apparent to those skilled in the art from this disclosure that the information of expected travels time(s) can be presented in other ways.

Figure 9:
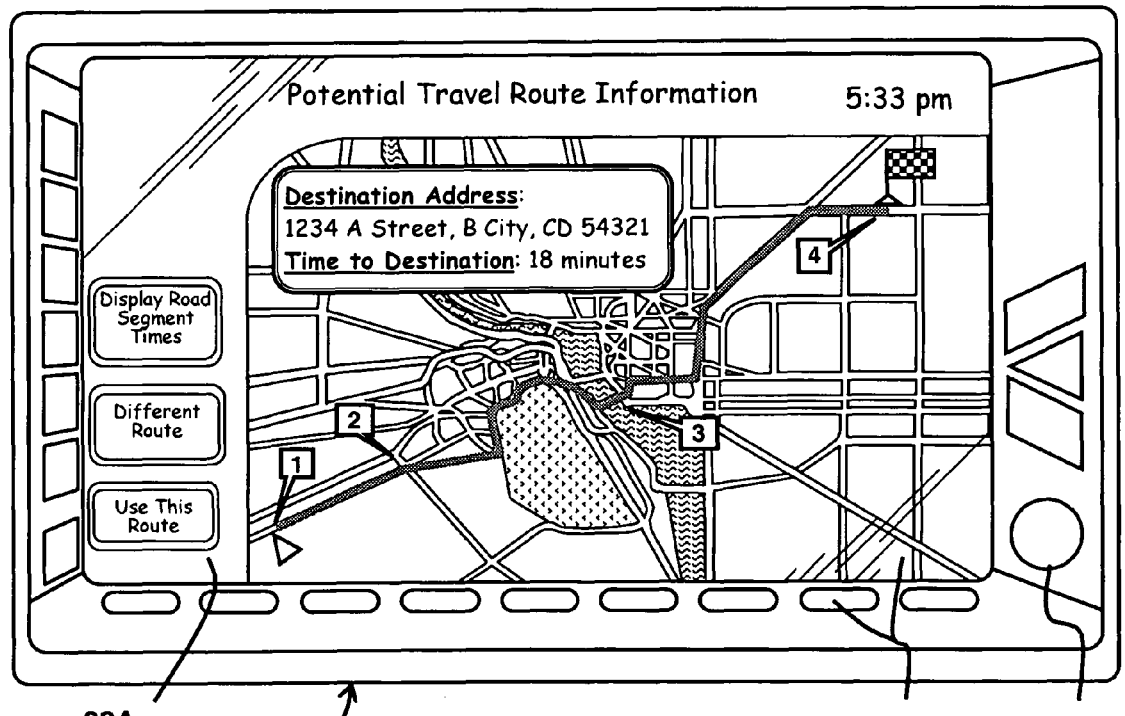
FIG. 9 is a pictorial representation of the "Potential Travel Route Information" screen display of the human-machine interface section of the on-board unit in which one of the potential travel route is displayed in accordance with the present invention.

In step S7, if the user does not wish to view an estimated time of arrival (ETA) accuracy map (e.g., FIG. 10) of one or more of the potential travel routes, but rather wants to immediately select the travel route, then the user touches a "Route #" selection button (touch screen button) to select that potential travel route as seen in FIG. 8. Then, the control unit 20 set that particular potential travel route as the selected travel route. At this point in time, when one of the potential travel routes has been selected as the selected travel route, the on-board navigation of the control unit 20 functions as a conventional navigation system to guide the user to the destination. In particular, for example, the screen display on the display 22A presents either a first intended maneuver of the selected travel route or a map of the selected travel route to the user on the display 22A as seen in FIG. 9.

Figure 10:
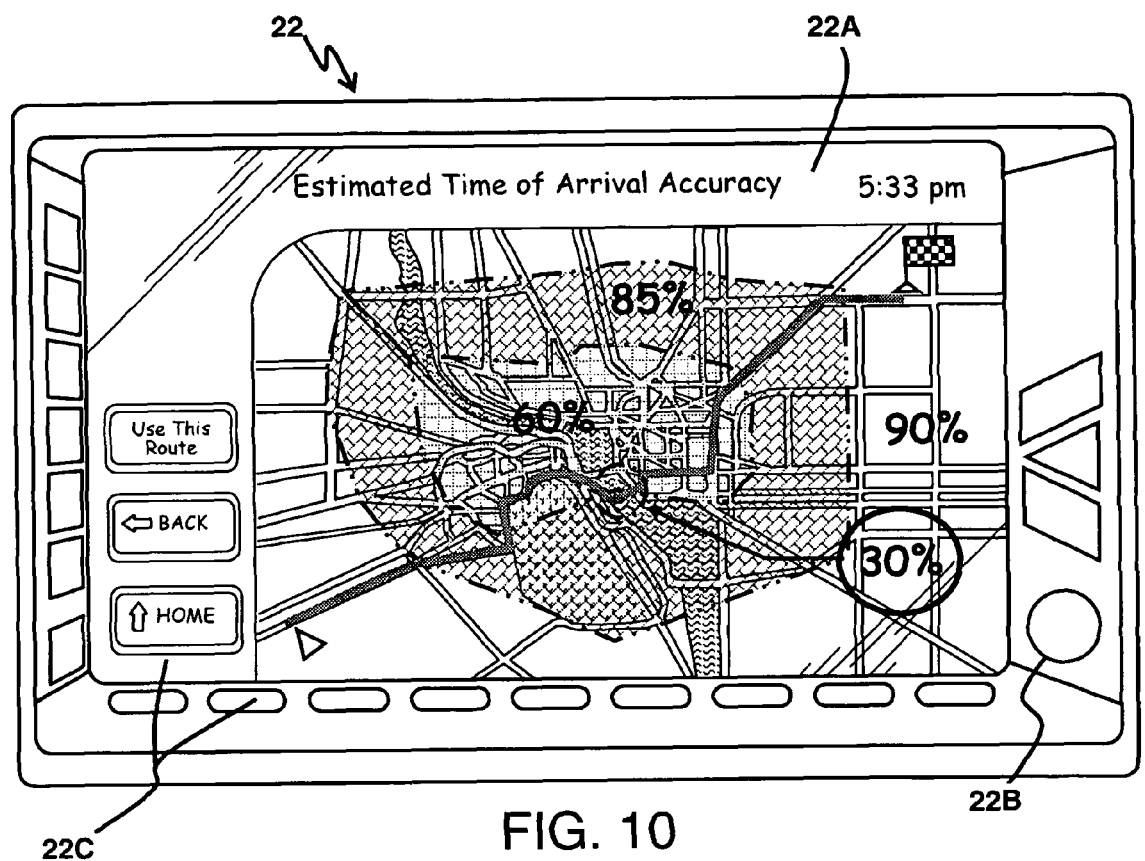
FIG. 10 is a pictorial representation of the "Estimated Time of Arrival Accuracy" screen display of the human-machine interface section of the on-board unit showing a map with the potential travel route and with the map being divided into various areas having the accuracy indicator provided for each of the areas in accordance with the present invention.

However, if the user selected to view the ETA accuracy map (e.g., FIG. 10) of one of the potential travel routes by touching a "ETA" selection button in step S6, then the "Estimated Time of Arrival Accuracy" screen display is presented as seen in FIG. 10 (step S8). In other words, the "Dynamic Navigation Route Selection" screen presents the user with the option of viewing the "Estimated Time of Arrival Accuracy" screen display for a particular route by touching one of the ETA Accuracy buttons (85% button, 85% button, 80%). Upon touching one of the ETA accuracy buttons, the display jumps from the "Dynamic Navigation Route Selection" screen display (FIG. 8) to "Estimated Time of Arrival Accuracy" screen display (FIG. 10). The "Estimated Time of Arrival Accuracy" screen display would then display the potential route as well as the different Arrival Accuracy areas so that the user can see if the potential travel route passes through a hot spot (areas to avoid).

Now, the user preferably has at least three choices or options (step S9), i.e., (1) select the potential travel route that is being currently viewed, (2) choose a different one of the potential travel routes, or (3) go to the home screen display (FIG. 6) to perform some other function. Of course, other choices or options could be provided to the user, if desired and/or needed, e.g., a traffic report option could be provided as well as other options that would help the user select a route. In other words, from the "Estimated Time of Arrival Accuracy" screen display, the user should be able to (1) select that the potential travel route, (2) return back to the "Dynamic Navigation Route Selection" screen display to select to view one of the other potential travel routes, or (3) return to home screen display (FIG. 6) to perform some other function. Also from this screen display, the user can tell whether the navigation should be programmed to avoid a selected area or not. Thus, by touching the "home" button, the user can program the on-board navigation of the control unit 20 to provide potential routes that avoid the so called hot spots.

For example, the quickest potential travel route (#1) presented on the screen display (FIG. 8) goes through the heart of a city and across a drawbridge that is periodically opened. The quickest potential travel route (#1) has a current ETA of 18 minutes, but is unpredictable because of the drawbridge. Thus, the ETA accuracy varies erratically from time to time. The second potential travel route (#2) uses mainly the highways and has a current ETA of 22 minutes. However, the second potential travel route (#2) can be fast (non-rush hour) or slow (rush hour). The third potential travel route (#3) uses secondary roads that avoid the highways and the drawbridge. Thus, third potential travel route (#3) can be very predictable (due to the timing of lights).

Accordingly, the navigation could present three different routes (with possibly some overlap) that have: (1) varying estimates for arrival time right now; (2) varying longest times (due to traffic, construction, weather, etc.); and (3) varying shortest times (due to traffic lights). However, without the ETA accuracy data, a driver may not know which route to choose. Thus, the present invention provides the driver with additional information to be able to make an informed decision on the potential travel routes. The Estimated Time of Arrival Accuracy" screen display (FIG. 10) is very beneficial in that it very simply show those areas that have the greatest uncertainty regarding arrival times. Thus, for example, in the cases of a known hot spot such as a drawbridge, the driver might choose to intentionally detour that zone of the map and allow the dynamic navigation to pick up once the danger zone had been circumnavigated. It might not be the quickest route, but it would be predictable. Alternatively, the driver might use the quickest route, and simply understand when the system is likely providing precise information.

Returning back to the flow chart of FIG. 5, next in step S9, if the user wants to immediately select the travel route, then the process precedes to step S7, where the on-board navigation of the control unit 20 functions as a conventional navigation system to guide the user to the destination. In particular, for example, the screen display on the display 22A presents either a first intended maneuver of the selected travel route or a map of the selected travel route to the user on the display 22A as seen in FIG. 9.

In step S9, if the user wants to select a different travel route (e.g., touching a "Different Route" selection button), then the process precedes back to step S5, where the option of selecting one of the other potential travel routes is available. The user can also quit this process at any time by selecting another option (such as pressing a "Reset Button") from the manual input controls 22C.

Thus, as can be readily seen in the screen displays of FIGS. 8 and 10, the historical time information or data is obtained by the vehicle on-board unit 12 from the external server 18 via the roadside units 16 and is presented to the user to provide expected travel times with ETA accuracy data to aid the user in selecting a travel route. In other words, the screen display 22A and/or the audio speaker 22B (the expected travel time reporting section) of the vehicle on-board unit 12 is configured to provide the expected travel times based on the historical time information for one or more potential travel routes. In particular, for example, the travel route information section of the control unit 12 is configured to display the potential travel route(s) and the associated expected travel times with ETA accuracy data for each of the potential travel routes based on the historical time information on the screen display 22A for the user to select, as seen in FIG. 8. Thus, the screen display 22A functions as the expected travel time reporting section for reporting to a user the expected travel times for each of the potential travel routes based on the historical time information.

Preferably, the external server 18 is configured to compile the actual motorist travel times and then report the expected travel times for each of the potential travel routes in the form of the statistical data to the user. For example, as seen in FIG. 8, the statistical data includes a fast expected travel time (fast day), a middle expected travel time (now) or a slow expected travel time (slow day). Thus, the external server 18 is configured to send the travel route information and the expected travel times associated with the travel route information such that the external server 18 send the middle expected times for each of the potential travel routes, the fast expected travel times for each of the potential travel routes and the slow expected travel times for each of the potential travel routes. The middle expected travel time is typically a time between the slow expected travel time and the fast expected travel time. The middle expected travel time is preferably either a median time or a mean time. Preferably, the slow expected travel time and the fast expected travel time are one or more standard deviations calculated from the historical time information based on the actual motorist travel times to navigate the various travel routes. Specifically, the fast expected travel time is at least one standard deviation less than the mean time and the slow expected travel time is at least one standard deviation more than the mean time. More preferably, the fast expected travel time is two standard deviations less than the mean time and the slow expected travel time is two standard deviations more than the mean time. Alternatively, the middle expected travel time is determined from one of the actual motorist travel times for the potential travel route, the fast expected travel time is a shorter actual motorist travel time than the middle expected travel time and the slow expected travel time is a longer actual motorist travel time than the middle expected travel time. In any event, the screen display 22A (the expected travel time reporting section) is preferably configured to report to the user at least one of the fast expected travel time, the middle expected travel time and the slow expected travel time.

Referring to FIG. 9, in these screen display, the potential travel route has been broken into road segments (three road segments shown) as indicated by points 1 to 4. As the host vehicle 10 with the vehicle on-board unit 12 travels along the selected route, the two-way wireless communication system 21 is configured to report the actual travel time between each of the segments to the external server 18. Thus, the external server 18 records this data so that the external server 18 can process the data with data from other vehicles to provide historical time information for each road segments. Also the two-way wireless communication system 21 (the historical data input section) is configured to receive updated information from the external server 18 via the roadside units 16 during travel between a route initialization point (e.g., point 1 in FIG. 9) and the destination point (e.g., point 4 in FIG. 9). As the host vehicle 10 travels along the selected route, the expected travel times can be updated based on current travel information such as traffic information. The control unit 20 obtains the updated expected travel times from the external server 18 based on updated historical time information for the potential travel route. Thus, the display unit 22A (the expected travel time reporting section) is configured to provide the updated expected travel times to the user based on the updated historical time information. For example, while the vehicle 10 is traveling, the display screen will show the vehicle moving on the map with the estimated "Time to Destination" changing as the vehicle approaches the destination point (e.g., point 4 in FIG. 9). When updated information is received, the "Time to Destination" of FIG. 9 will be revised and the user notified of the revision via a signal, e.g., an auditory signal, a haptic signal, a visual signal and/or the like.

In the preferred embodiment, the external server 18 is configured to compile the actual motorist travel times for particular times of day, e.g., morning rush hour, non-rush hour, evening rush hour, holiday times, etc. Thus, the expected travel times (fast, slow, middle) of the historical time information are time sensitive based on a time of day that the potential travel route is to be traveled. In the illustrated embodiment, all expected travel times are "evening rush hour" times since the travel route information is being requested at "5:33 pm" on a weekday. In other words, these expected travel times are based on actual motorist travel times from "evening rush hour" on a weekday.

Although the vehicle navigation system utilizes the off-board dynamic navigation system using the external server 18 as the navigation server in the embodiment described above, the present invention is not limited to such arrangement. More specifically, the host vehicle 10 can use the conventional on-board navigation system with route guiding function and the stored map data instead of receiving map and route information from the off-board navigation system. In such case, the vehicle on-board unit 12 preferably sends the travel route calculated by the on-board navigation system to the external server 18 via wireless communications, and the external server 18 preferably determines and sends the historical time information associated with the travel route received from the vehicle on-board unit 12. The remaining processing will be the same as the processing as explained above.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle on-board unit comprising:
   a destination input section configured to enter a destination point,
   a historical data input section configured to provide historical estimated time of arrival information based on a plurality of actual motorist travel times to the destination point; and
   an estimated time of arrival reporting section configured to report to a user an estimated time of arrival and an accuracy indicator for the estimated time of arrival from the historical estimated time of arrival information.

2. The vehicle on-board unit according to claim 1, further comprising
   a travel route information section configured to provide at least one potential travel route to the destination point.

3. The vehicle on-board unit according to claim 2, wherein
   the travel route information section is further configured to provide a plurality of potential travel routes to the destination point, and
   the estimated time of arrival reporting section is further configured to report to the user an estimated time of arrival and an accuracy indicator for each of the potential travel routes based on the historical estimated time of arrival information.

4. The vehicle on-board unit according to claim 2, wherein
   the estimated time of arrival reporting section includes a display unit for visually displaying the potential travel route.

5. The vehicle on-board unit according to claim 4, wherein
   the estimated time of arrival reporting section is further configured to display the estimated time of arrival and the accuracy indicator together on a single screen display on the display unit.

6. The vehicle on-board unit according to claim 4, wherein
   the estimated time of arrival reporting section is further configured to display a map including the destination point with the map being divided into areas having the accuracy indicator provided for each of the areas.

7. The vehicle on-board unit according to claim 1, wherein
   the historical data input section includes a wireless communication device configured to receive the historical estimated time of arrival information from an external source.

8. The vehicle on-board unit according to claim 7, wherein
   the wireless communication device is further configured to receive at least one potential travel route to the destination point from the external source.

9. The vehicle on-board unit according to claim 1, further comprising
   a vehicle positioning section configured to provide a current location of a host vehicle equipped with the vehicle on-board unit; and
   a vehicle travel data collecting section configured to collect travel route data that includes travel times between two locations of the host vehicle as determined by the vehicle positioning section.

10. The vehicle on-board unit according to claim 9, wherein
    the historical data input section includes a wireless communication device configured to send recorded travel times to an external source.

11. The vehicle on-board unit according to claim 10, wherein
    the wireless communication device is further configured to receive the historical estimated time of arrival information from an external source.

12. The vehicle on-board unit according to claim 1, wherein
    an estimated time of arrival reporting section displays the estimated time of arrival and the accuracy indicator to the user in response to user input.

13. The vehicle on-board unit according to claim 12, wherein
    the estimated time of arrival reporting section is further configured to display a map divided into areas having the accuracy indicator provided for each of the areas.

14. The vehicle on-board unit according to claim 1, wherein
    the accuracy indicator includes a percentage of accuracy based on the historical estimated time of arrival information.

15. The vehicle on-board unit according to claim 14, wherein
    a higher percentage for the accuracy indicator represents a higher accuracy.

16. The vehicle on-board unit according to claim 14, wherein the estimated time of arrival includes at least one of a fast time and a slow time.

17. An estimated time of arrival reporting system comprising:
- a plurality of vehicles each including
    - a vehicle travel data collecting section configured to collect travel route data that includes travel times between at least two locations actually traveled;
    - a destination input section configured to enter a destination point,
    - a two-way communication unit configured to transmit the travel route data and receive historical estimated time of arrival information including an estimated time of arrival and an accuracy indicator for the estimated time of arrival, and
    - an estimated time of arrival reporting section configured to report to a user the estimated time of arrival and the accuracy indicator from the historical estimated time of arrival information; and
- a base station including two-way communications configured to receive the travel route data from the vehicles, and to selectively send the historical estimated time of arrival information based on the travel route data that was received to the vehicles in response to a vehicle's request.

18. The estimated time of arrival reporting system according to claim 17, wherein
the base station is further configured to provide at least one potential travel route to the destination point in response to the vehicle's request.

19. The estimated time of arrival reporting system according to claim 17, wherein
the base station is further configured to provide a plurality of potential travel routes to the destination point, and send the historical estimated time of arrival information relating to each of the potential travel routes.

* * * * *